United States Patent Office 3,229,805
Patented Jan. 18, 1966

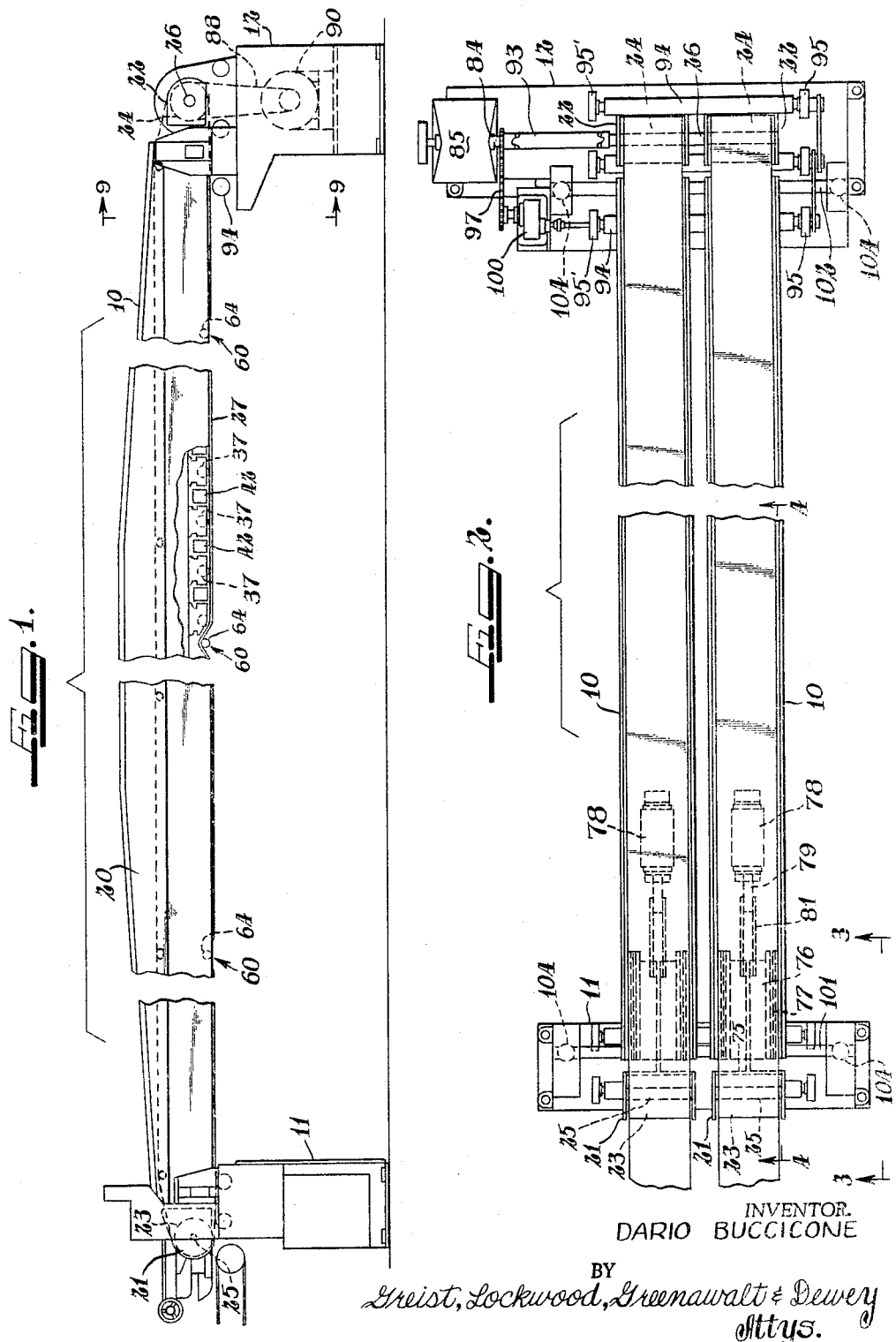

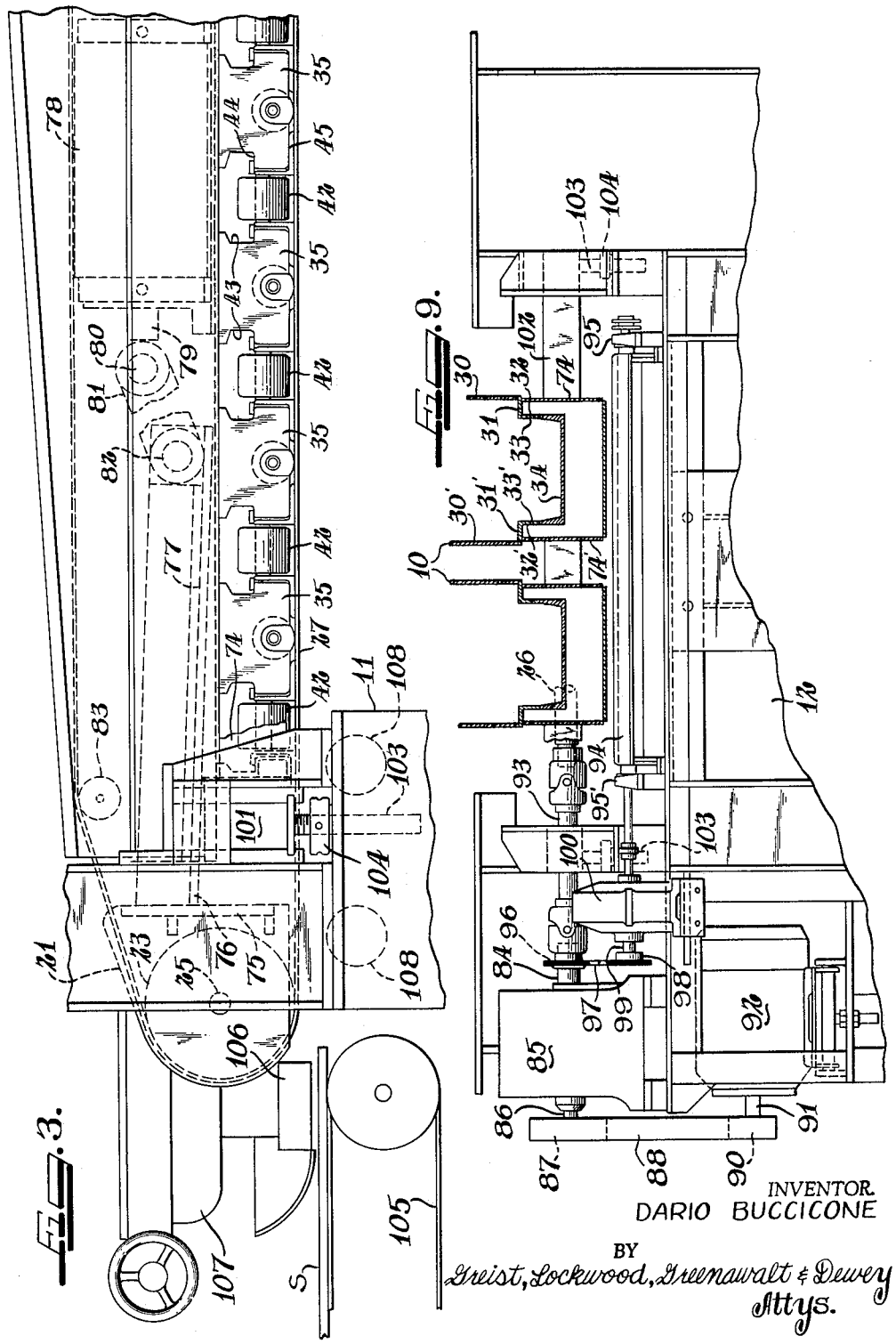

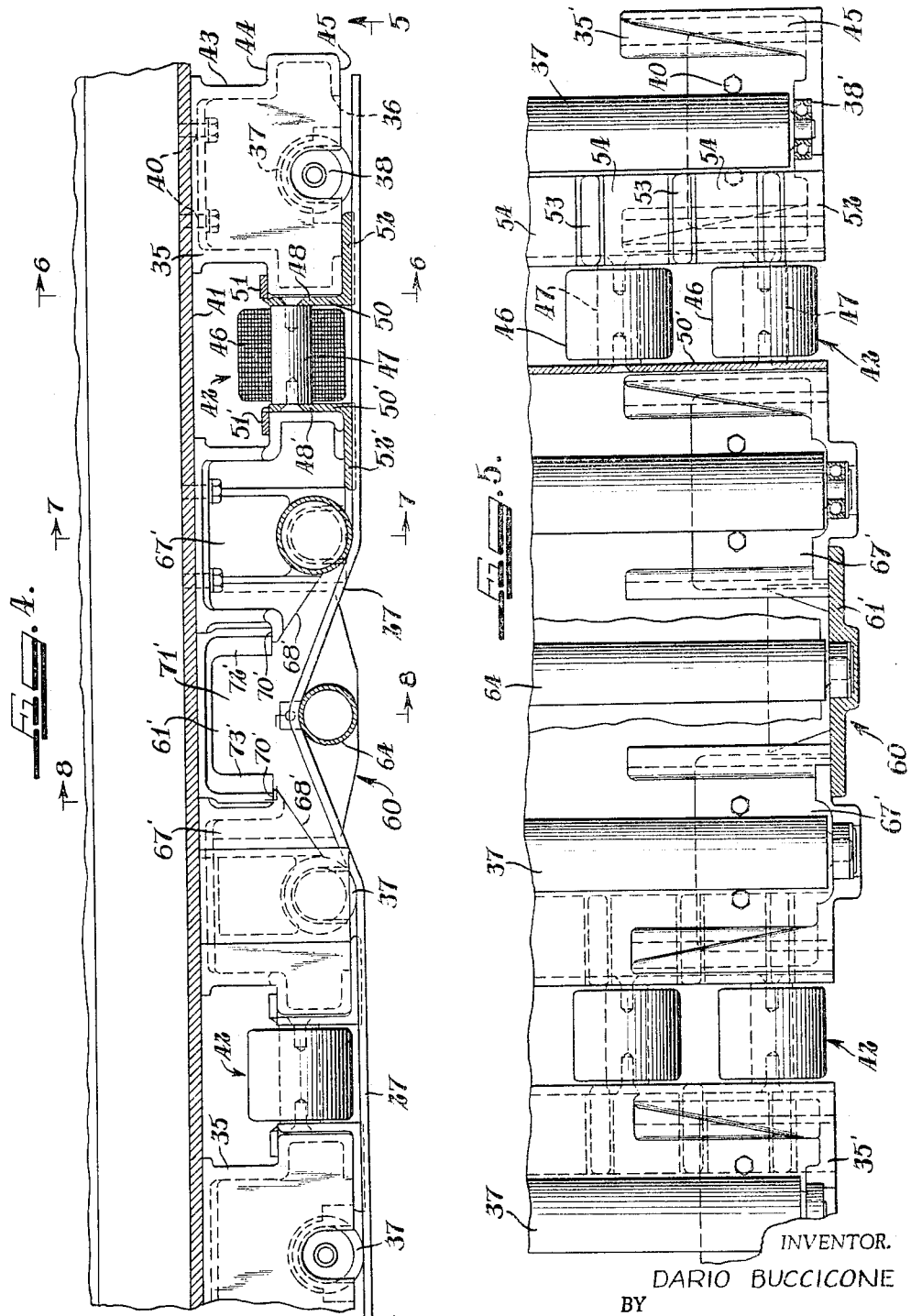

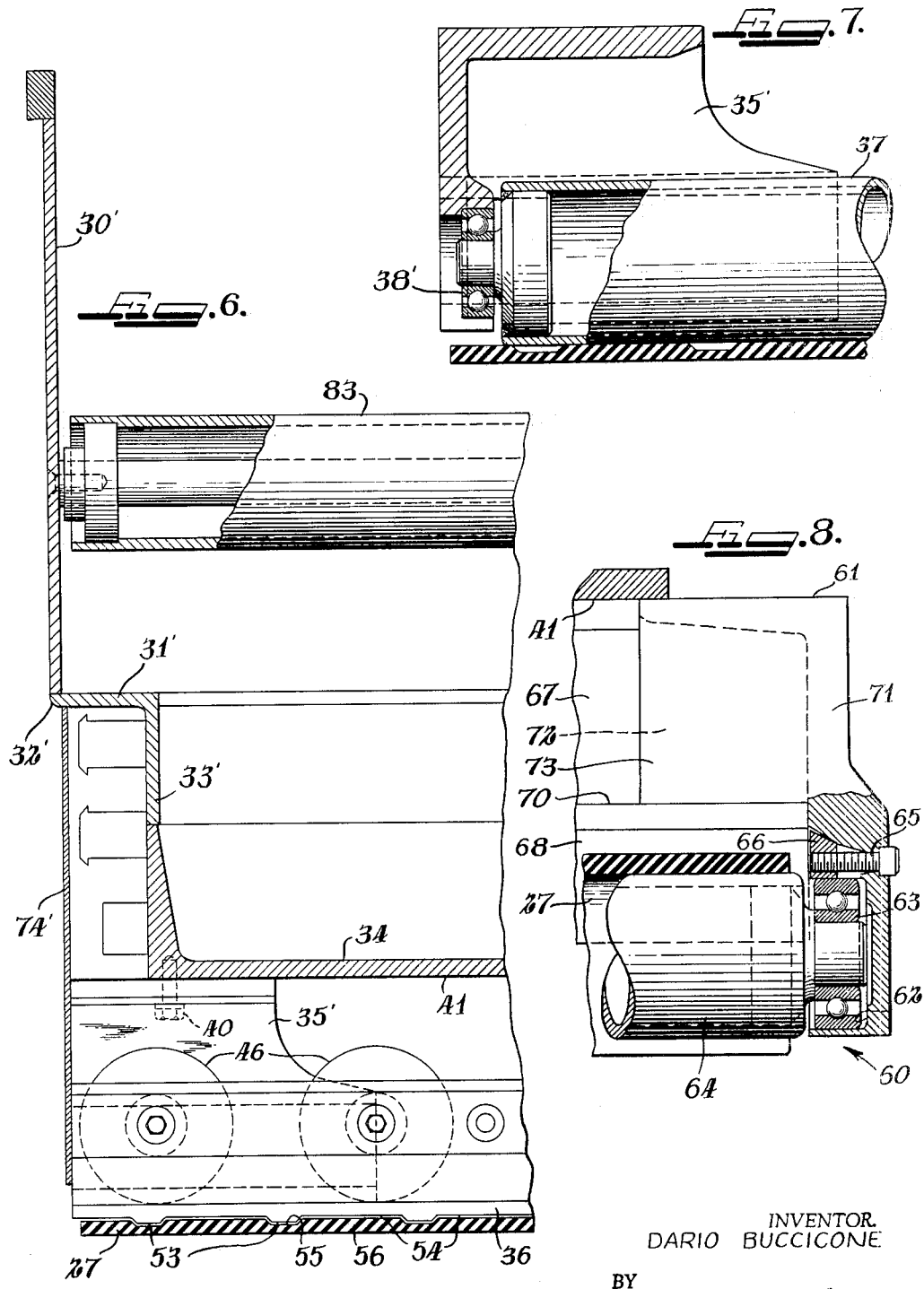

3,229,805
MAGNETIC RAIL CONVEYOR
Dario Buccicone, Gary, Ind., assignor to Bucciconi Engineering Co., Inc., Gary, Ind., a corporation of Indiana
Filed Apr. 1, 1964, Ser. No. 356,566
16 Claims. (Cl. 198—41)

This invention relates to article conveyors and is more particularly concerned with improvements in an overhead conveyor of the type which employs electromagnets for holding metal sheets or similar articles against the bottom surface of a traveling belt.

Overhead conveyors of rail-like form have heretofore been developed which rely on magnetic force for holding sheets of steel or similar magnetizable materials against the bottom surface of a traveling belt so as to advance successive sheets for deposit on a pile or on another conveyor. A typical conveyor of this character is shown, for example, in my Patent No. 2,600,475, dated June 17, 1952. In this type conveyor, relatively narrow belts have been employed which are substantially less in width than the width of the bottom of the conveyor rail, and the belts have been arranged in spaced grooves or guide recesses on the bottom surface of a belt guiding plate which is secured in the bottom face of the conveyor rail. Because of their weight and their unsupported lengths the belts sag and it has been customary to curve or bow the bottom face of the conveyor rail in order to accommodate a portion of the sag in the belts and reduce the amount of tension required in the belts to keep them seated in the guide grooves. This type of conveyor has been used extensively for handling sheet materials which are flat and which are adapted to bend sufficient to follow the bowed contour of the bottom face of the conveyor unit. However, some sheet materials which strongly resist bowing and which do not have plain surfaces such as steel sheets with longitudinal corrugations cannot be handled satisfactorily with this type conveyor. Various modifications have been tried in an effort to adapt this type of multiple belt rail conveyor to the handling of corrugated sheets and the like. Some wide belt arrangements have been resorted to for handling such sheets but they have generally not been successful because of the inability to overcome the tendency to sag excessively due to their weight particularly in conveyors of substantial length and because of the increased cost of operating the high strength magnets required to attract the sheets through the belts.

It is a general object of the present invention to provide a magnetic rail-type belt conveyor which is constructed with a plain bottom surface so that it is particularly adapted for handling metal sheets having lengthwise corrugations or similar material having substantial resistance to bending and which is of relatively simple construction, efficient in operation, and economical to build.

It is a more specific object of the invention to provide an overhead magnetic rail-type belt conveyor unit which employs a single belt having a width corresponding approximately to the width of the conveyor unit with the lower run of the belt being supported at spaced points along the length of the conveyor so as to travel in a substantial rectilinear path and the belt being so constructed and guided beneath the magnets so that maximum pull on the sheet results and the need for bending the sheet in order to conform to the surface of the bottom of the conveyor is eliminated.

A still more specific object of the invention is to provide an overhead electromagnetic conveyor for sheets or similar articles which is characterized by an elongate rail-like support frame having a relatively wide article carrying belt supported by transverse rollers adjacent the opposite ends of the support frame, the belt having a lower run which covers substantially the bottom face of the support frame and with transversely extending belt supports spaced intermediate the end rollers for holding the intermediate portions of the lower run of the belt against the bottom face of the conveyor and in a substantially rectilinear path.

Another object of the invention is to provide an overhead electromagnetic conveyor for metal sheets or the like which comprises an elongate support frame having a relatively wide sheet carrying belt supported at opposite ends of the frame on transverse end support rollers and with transverse intermediate support rollers spaced along the bottom surface of the support frame for holding the bottom run of the belt in a substantially rectilinear path, and a plurality of electromagnet assemblies supported for lateral sliding movement in the bottom portion of the support frame above the uppermost face of the bottom run of the belt so that the electromagnet assemblies may be removed from the side of the support frame without removing the belt and the assemblies including one or more plate-like core extensions arranged with a downwardly facing ribbed surface for engaging the grooved inner surface of the belt so that the magnets exert maximum pull on the sheets through the thinner areas of the belt in the bottom of the grooves therein.

A further object of the invention is to provide an overhead magnetic rail-type belt conveyor unit which has a planar bottom face and which employs a relatively wide belt of substantial length with the bottom run of the belt adapted to be supported on longitudinally spaced, transverse idler rollers which hold the belt against the bottom face of the unit so as to adapt the conveyor to the handling of sheets or like objects which have substantial resistance to longitudinal bending or bowing.

A still further object of the invention is to provide in an overhead magnetic rail-type belt conveyor which employs magnetic force to hold sheets or like objects against the bottom face of the bottom run of a traveling belt, magnet assemblies each comprising a plurality of magnets mounted on a drawer-like frame, and slide members on the unit for supporting the frame so that it may slide laterally of the conveyor enabling the magnets to be readily removed from the side of the conveyor for repair or replacement without disturbing the belt.

These and other objects and advantages of the invention will be apparent from a consideration of the conveyor apparatus which is shown by way of illustration in the accompanying drawings wherein:

FIGURE 1 is a side elevational view, with portions broken away, of a sheet piler employing a magnetic rail conveyor having incorporated therein the features of the present invention;

FIGURE 2 is a plan view, with portions broken away, of the apparatus of FIGURE 1;

FIGURE 3 is a partial side elevation, taken on the line 3—3 of FIGURE 2, to an enlarged scale;

FIGURE 4 is a fragmentary section, taken on the line 4—4 of FIGURE 2, to an enlarged scale;

FIGURE 5 is a bottom view of the conveyor section shown in FIGURE 4, with portions broken away;

FIGURE 6 is a partial cross section taken on the line 6—6 of FIGURE 4, to a larger scale;

FIGURE 7 is a partial cross section taken on the line 7—7 of FIGURE 4, to a larger scale;

FIGURE 8 is a partial cross section taken on the line 8—8 of FIGURE 4, to a larger scale; and FIGURE 9 is a cross section taken on the line 9—9 of FIGURE 1 to an enlarged scale and with portions broken away or omitted.

Referring to FIGURES 1 and 2, there is illustrated a piler assembly comprising a pair of rail-like conveyor units 10 mounted in parallel, side-by-side relation on upright end supports 11 and 12. The assembly shown embodies the main elements of a sheet piler with suitable means (not shown) for supporting a pile of sheets between the end frames 11 and 12. However, the conveyor arrangement may be employed in other sheet handling operations.

Each of the conveyor rail units 10 comprises an elongate frame 20 with pulley housings 21 and 22 supported at the entrance and exit ends, respectively, of the frame 20. Belt supporting pulleys 23 and 24 are mounted on transversely extending shafts 25 and 26 in each of the housings 21 and 22 for supporting at opposite ends of the frame a traveling belt 27 of a width sufficient for the bottom run to extend across the bottom face of the unit.

The frame 20 of each conveyor rail unit 10 comprises an upper or top section consisting of vertically disposed, laterally spaced, parallel elongate side plates 30 and 30' (FIGURES 3, 6 and 9) which extend upwardly of the outer edges of the horizontal top flanges 31 and 31' of horizontally disposed angle bars 32 and 32' which face outwardly and downwardly and have the lower edges of their vertical flanges 33 and 33' connected to the top edges of an upwardly facing channel member 34 which forms a base for supporting a plurality of pairs of longitudinally spaced roller brackets 35 and 35', the latter being identical in construction except for being rights and lefts and the respective brackets of each pair thereof being transversely aligned. Each of the brackets 35 and 35' is in the form of a casting of generally rectangular cross section with its bottom face having an opening 36 for accommodating a belt engaging roll 37 which is journaled at its opposite ends in bearings 38 and 38' secured in the end brackets 35 and 35' so as to be supported in free rolling relation. The brackets 35 and 35' are secured by pairs of bolts 40 to the bottom face 41 of the channel 34. The pairs of brackets 35 and 35' and the rollers 37 which are supported thereby are spaced longitudinally of the frame 20 so as to accommodate between each pair of rollers 37 an assembly 42 of electromagnets. The roller supporting brackets 35 and 35' are formed with upper recesses 43 and top and bottom horizontally disposed guideway forming ledges or slide formations 44 and 45 for accommodating the magnet assemblies 42, the latter being of drawer-like construction so as to slide laterally of the frame 20 into and out of the space between adjacent pairs of roller brackets 35 and 35'.

Each of the magnet assemblies 42 (FIGURES 4 to 6) comprises, in the form of the apparatus shown, four electromagnet coils 46 arranged in spaced relation on pole pieces 47 which extend in the direction longitudinally of the frame 20 between upstanding flanges 48 and 48' of a pair of oppositely facing angle bars 50 and 50', the latter each having a top plate or bar 51 and 51' welded to the top edge and forming with the bottom flanges 52 and 52' oppositely facing channel-shaped parallel slide members. The assembly 42 comprising the slide members and the connecting core members and associated magnet coils constitute a drawer-like unit which is adapted to be positioned with the top slide plates 51 and 51' resting on the ledges 44 of adjacent pairs of roll support members 35 and 35' and with the lower flanges 52 and 52' forming a guide for engagement with the top surface of the lower run of the belt 27. The bottom flanges 52 and 52' are of a width which is less than half the width of the roll support brackets 35 and 35' so as to accommodate the rolls 37 between successive assemblies 42 and permitting engagement of the top surface of the bottom belt run with the rolls 37. The lower flanges or shoe forming magnet members 52 and 52' of the drawer-like magnet unit which constitute end extensions on the magnet cores 47 are grooved on the bottom faces so as to provide a plurality of ribs 53 and 53', which ribs are laterally spaced with separating recesses 54 and 54' and extend in a direction longitudinally of the conveyor unit.

The belt 27 is provided with longitudinal grooves 55 on its inner face which are spaced to receive the ribs 53 on the magnet shoes 52 and 52'. This rib and groove arrangement holds the belt 27 in its path and also enables the outside face 56 of the belt to be brought closer to the magnets so as to increase the effectiveness of the magnetic force in holding the articles against the bottom face of the belt 27.

A number of belt supporting roller assemblies 60 (FIGURES 4, 5 and 8) are spaced throughout the length of the unit 10 to hold the belt in its horizontal path or plane and eliminate undesirable sagging. The roller assemblies 60 each comprise a pair of bearing supporting castings 61 and 61' at opposite ends thereof which are of identical construction and which are mounted on the bottom face 41 of the frame 20 in laterally aligned and spaced relation and provide end bearing housings or recesses 62 for receiving bearings 63 in which the ends of a belt supporting roller 64 are journaled. The recesses 62 are formed so that the rolls 64 may be readily removed with the end bearings 63 attached and a bolt 65 and nut forming wedge 66 are provided for clamping each bearing 63 in position. The rollers 64 are spaced at intervals along the length of the unit to support the belt 27 and hold it against the bottom face of the conveyor with the number of roller assemblies 60 being determined by the length of the belt, there being a sufficient number to prevent excessive sag in the belt. The roller assemblies 60 are positioned between a pair of the belt engaging rollers 37 and the adjacent roller end supports 67 and 67' are cut away at 68 and 68' at the sides adjoining the roller assemblies 60 so as to provide guideways or supporting ledges 70 and 70' for positioning and slidably supporting the bearing supporting castings or housings 61 and 61' which form the end members of the assemblies 60. The roller end supports 67 and 67' are otherwise identical with end support brackets 35 and 35'. The end supporting members 61 and 61' of the roller assemblies 60 are identical and they are slidably mounted in the same manner at opposite sides of the frame 20. Each bearing support casting or end member 61 and 61' has an outside or end wall 71 and 71' of a size to overlap outer face portions of the adjoining roller brackets 67 and 67' so as to limit the inward sliding movement of the members 61 and 61' and properly position the assemblies for receiving the belt 27. Each end member 61 and 61' has parallel spaced side wall portions 72, 73 and 72', 73' which form slides with their bottom edges engaging the ledges 70 and 70', the latter forming guideways on the adjacent roller support brackets 67 and 67'. The roller assemblies 60 may be readily removed for replacement or repair without removal of the belt 27 by merely relasing the tension in the belt 27 and sliding the bracket members 61 and 61' laterally of the frame 20 after the bolt and nut assemblies 65 and 66 have been loosened to release the end bearings 63. Cover plates 74 and 74' (FIGURES 1, 6 and 9) may be provided, if desired, for the lower portion of the frame 20.

The pulley housing 21 at the entrance end of each conveyor rail unit 10 is mounted for sliding adjustment at the end of the frame 20 so as to provide for proper tension in the belt 27. The housing 21 has an inner vertical wall 75 (FIGURES 2 and 3) and slide forming member 76 extending in a generally horizontal direction which is slidably mounted in a co-operating guideway 77 in the end of the frame 20. The guideway 77 is inclined somewhat toward the lower face of the frame 20 so that there is some upward pull on the belt 27 at the end of the frame 20 when the pulley housing 21 is extended. An air cylinder 78 is mounted in fixed position in the frame 20 with the piston 79 pivotally connected at 80 to one end of a link bar 81 which is pivotally connected at 82 to the slide 76 so that the position of the housing 21 and associated end pulley 23 may be adjusted by operation of the cylinder 78 to provide the required tension in the belt 27.

The uppermost run of the belt 27 is supported by idler rollers 83 (FIGURES 3 and 6) spaced as required throughout the length of the frame 20. The belt 27 is driven by driving the shaft 26 (FIGURES 1, 2 and 9) at the exit end of the conveyor units. In the apparatus illustrated, the shaft 26 is connected at one end to the power output shaft 84 of a gear box 85 supported on the end frame 12 and having a power input shaft 86 with a pulley 87 thereon connected by the belt 88 with the pulley 90 on the power shaft 91 of a drive motor 92. An extensible universal connecting member 93 is provided between the shaft 26 and the shaft 84 so as to permit vertical adjustment of the conveyor rail units 10 without disturbing the drive for the units. The output shaft 84 also provides a drive for one or more of a plurality of bed rollers 94 which are supported in end bearing forming brackets 95 and 95′ (FIGURE 9) on the end frame, the rollers 94 being positioned in fixed relation below the ends of the conveyor rail units 10. The shaft 84 carries a sprocket 96 which is connected by a chain 97 with a sprocket 98 on the end of a shaft 99 which is coupled to the shaft of one of the bed rolls 94 through a gear box 100. The other bed rolls 94 may be connected to the driven roll by chain and sprocket drive connections if desired.

The conveyor rail unit frames 20 are supported at opposite ends on cross beams 101 and 102 which cross beams 101 and 102 are in turn supported on the end frames 11 and 12 in an identical manner for vertical adjustment so as to position the rail units 10 at the proper height for handling sheets of different thickness. The cross beams 101 and 102 are each provided at their opposite ends with a depending pin 103 (FIGURES 3 and 9) which is threaded to receive a nut forming member 104. The pins 103 extend downwardly through apertures in the frames 11 and 12 and the nut members 104 rest on the top of the cross members or suitable brackets provided therefor in the frames 11 and 12 so that the cross beams 101 and 102 are raised or lowered by turning the nut members 104 on the threaded pins 103.

The sheets S are delivered beneath the conveyor units 10 by a conveyor 105 at the entrance end of the piler and a detector device indicated at 106 on an adjustable support, as indicated at 107, is provided for controlling the circuit delivering current to the magnet coils 46 in the usual manner. The detector device 106 may be an electric eye or any other device which is actuated by the passage of the sheet or other article being handled. Rolls 108 are mounted for free rotation in the end frame 11 below the ends of the conveyor units 10 to support the leading ends of the sheets until they are picked up by the magnets.

In using the apparatus the rail units 10 are vertically adjusted for the thickness of the sheet being handled and current is supplied to the magnet coils 46 through a suitable control circuit including detector 106. The sheets are delivered by the feed conveyor 105 to the bottom faces of the belts 27 on the conveyor units 10 and are held in a substantially horizontal plane by the pull of the magnets as the belts 27 advance the sheets to the discharge end of the conveyor. The magnets may be controlled to drop the sheets between the end frames 11 and 12 or to pass the sheets on through the machine as desired.

The arrangement of the magnet supporting tray units so that they slide out of the side of the conveyor permits ready removal of the magnets for repair or replacement without disturbing the belt 27 and also the magnetic force is spread over a larger area with more penetration through the belt than in arrangements heretofore employed. The straight bottom surface on the conveyor adapts the conveyor to the handling of materials such as corrugated sheets which resist bending in the longitudinal direction. Steel rolls may be used for supporting the belt which are less costly than the non-magnetic materials generally required in order to avoid interference with the flux paths.

While particular materials and specific details of construction are referred to in describing the illustrated form of the apparatus, it will be understood that other materials and equivalent details of construction may be resorted to within the spirit of the invention.

I claim:

1. An overhead magnetic conveyor unit comprising an elongate rail-like mounting frame which is adapted to be disposed in a generally horizontal position, a plurality of longitudinally spaced, roller supporting brackets mounted on the lower face of said frame and belt engaging rollers journaled in said brackets for free rotation on transversely extending axes, a plurality of electromagnet assemblies mounted between said roller supporting brackets, each of said electromagnet assemblies including a pair of oppositely facing channel members with confronting wall forming portions connected by electromagnet core forming members, an electromagnet coil mounted on each of said core forming members, said brackets having transversely extending track formations for slidingly supporting said channel members, said channel members having parallel spaced grooves in the lowermost faces thereof which extend longitudinally of the conveyor, belt supporting rollers at opposite ends of said mounting frame, a belt of a width corresponding approximately to the width of said mounting frame carried on said end rollers and having longitudinal grooves for cooperation with the grooved bottom faces of said channel members and belt supporting rollers spaced along the bottom face of said unit and above said belt engaging rollers over which the lowermost run of the belt is trained for holding the belt against the belt engaging rollers and the lower faces of said channel members.

2. An overhead magnetic conveyor unit comprising a relatively narrow elongate mounting frame which is adapted to be disposed in a generally horizontal position, a plurality of longitudinally spaced brackets mounted on the lower face of said mounting frame and belt engaging rollers journaled in said brackets for free rotation on transversely extending axes, electromagnet assemblies mounted between said brackets, each of said electromagnet assemblies including a pair of parallel frame members with oppositely disposed parallel wall portions, electromagnet core forming members extending between said wall forming portions, electromagnet coils mounted on said core forming members, transversely extending guideway formations between said brackets for slidingly supporting said electromagnet assemblies, the frame members of said assemblies having bottom plate portions with parallel grooves which extend longitudinally of the conveyor unit, belt supporting rollers at opposite ends of said mounting frame, a belt of a width to extend substantially across the bottom face of said mounting frame carried on said end rollers and having parallel longitudinal grooves for accommodating the guide ribs formed between the grooves in the bottom plate portions of said electromagnet assemblies and belt supporting rollers on transversely extending axes spaced longitudinally along the bottom face of said mounting frame between said belt engaging rollers, for holding the lowermost run of the belt against the adjacent belt engaging rollers and the lower faces of the bottom plate portions of adjoining electromagnet assemblies.

3. An overhead magnetic conveyor unit comprising an elongate rail-like support frame which is adapted to be disposed in a generally horizontal position, a plurality of longitudinally spaced, roller supporting brackets mounted on the lower face of said frame and transversely extending rollers journaled for free rotation in said brackets and providing a rectilinear path for the bottom run of a traveling belt, a plurality of electromagnet assemblies mounted between said roller supporting brackets, each of said electromagnet assemblies including a pair of transversely extending, oppositely facing channel forming members with confronting wall forming portions connected by electromagnet core forming members extending longitudinally of the support frame, an electromagnet coil mounted on each of said core forming members, said brackets having transversely extending tracks for supporting said channel members, said channel members having downwardly facing bottom surfaces with parallel spaced ribs which extend longitudinally of the support frame, belt supporting rollers at opposite ends of said support frame, a relatively wide belt carried on said end rollers and having longitudinal grooves for cooperation with the ribs on the bottom surfaces of said channel members, and transversely extending rollers spaced along the bottom face of said support frame for holding the lowermost run of the belt against the bottom surfaces of said channel members.

4. An overhead magnetic conveyor unit for metal sheets or like articles comprising a relatively narrow elongate support frame which is adapted to be disposed in a generally horizontal position, a plurality of pairs of transversely aligned, longitudinally spaced brackets mounted on the lower face of said support frame and a belt engaging roller journaled in each pair of said brackets for free rotation on a transversely extending axis, electromagnet assemblies mounted between said pairs of brackets, each of said electromagnet assemblies including a pair of transversely extending parallel slide members with oppositely disposed parallel wall forming portions, electromagnet core forming members extending between the wall forming portions of said slide members, electromagnet coils mounted on said core forming members, transversely extending guide formations on said brackets for supporting said slide members, said slide members having bottom portions with longitudinally extending parallel ribs, belt supporting rollers at opposite ends of said elongate support frame, a belt of a width to extend substantially across the bottom face of said support frame carried on said end rollers and having parallel, longitudinally extending grooves for accommodating the ribs on said slide members and transversely disposed belt supporting rollers spaced longitudinally along the bottom face of said conveyor support frame for urging the lowermost run of the belt against the belt engaging rollers and the lowermost faces of said slide members.

5. An overhead magnetic conveyor unit comprising a relatively narrow elongate support frame having a plane bottom surface which is adapted to be disposed in a generally horizontal position, a plurality of longitudinally spaced belt engaging rollers journaled in said support frame for free rotation on transversely extending axes, tray-like electromagnet assemblies mounted in the bottom of said support frame, each of said electromagnet assemblies including frame members with oppositely disposed parallel wall portions, electromagnet core members extending between said wall forming portions, electromagnet coils mounted on said core members, transversely extending guides for slidingly supporting said tray-like assemblies, said wall portions having downwardly projecting parallel ribs which extend longitudinally of the support frame, belt supporting rollers at opposite ends of said support frame, a belt of a width to extend substantially across the bottom face of said support frame carried on said end rollers and having parallel longitudinal grooves for accommodating the ribs on said wall portions and means spaced longitudinally along the bottom face of said support frame between said belt engaging rollers for holding the lowermost run of the belt against said belt engaging rollers and said ribs.

6. An overhead magnetic conveyor unit comprising a relatively narrow elongate mounting frame which has a plane bottom face adapted to be disposed in a generally horizontal position, a plurality of longitudinally spaced bearing supporting brackets mounted on the bottom face of said frame and belt engaging rollers journaled in bearings in said brackets for free rotation on transversely extending axes, electromagnet assemblies mounted between said brackets, each of said electromagnet assemblies including drawer-like frames with oppositely disposed parallel wall forming portions, electromagnet core forming members extending between said wall forming portions, the wall forming portions constituting extensions of said magnet cores, electromagnet coils mounted on said cores, transversely extending guides between said brackets for slidingly supporting said drawer-like frames, said core extensions having bottom plate portions with parallel ribs which extend longitudinally of the conveyor unit, belt supporting rollers at opposite ends of said conveyor unit, an article carrying belt of substantial width carried on said end rollers with a bottom run extending along the bottom face of said mounting frame and having parallel longitudinal grooves in its innermost surface for accommodating the ribs in said bottom plate portions and belt supporting members spaced longitudinally along the bottom face of said supporting frame for holding the bottom run of the belt against the belt engaging rollers and the lower faces of said bottom plate portions.

7. An overhead magnetic conveyor unit as recited in claim 6, and a housing for the belt supporting roller at one end of the mounting frame which is supported for longitudinal sliding movement on said mounting frame and hydraulic means for extending said housing to tension said article carrying belt.

8. An overhead magnetic conveyor unit comprising a relatively narrow elongate mounting frame which has a plane bottom surface adapted to be disposed in a generally horizontal position, a plurality of longitudinally spaced brackets mounted in the lower portion of said mounting frame and belt engaging rollers journaled in said brackets for free rotation on transversely extending axes, electromagnet assemblies mounted between pairs of said brackets, each of said electromagnet assemblies including a pair of parallel frame members with oppositely disposed wall portions, an electromagnet core forming member extending between said wall forming portions, an electromagnet coil mounted on said core forming member, transversely extending guideway formations on said mounting frame for slidingly supporting said electromagnet assemblies, the frame members of said assemblies having bottom surface portions with parallel ribs which extend longitudinally of the conveyor unit, belt supporting rollers at opposite ends of said mounting frame, a belt of substantial width carried on said end rollers and having parallel longitudinal grooves for accommodating the ribs on the bottom surface portions of said electromagnet assemblies and transversely extending belt supporting rollers spaced longitudinally along the bottom face of said mounting frame for holding the lowermost run of the belt against the belt engaging rollers and the bottom surface portions of said electromagnet assemblies.

9. An overhead magnetic conveyor unit comprising a relatively narrow elongate support frame having a plane bottom surface which is adapted to be disposed in a generally horizontal position, a plurality of longitudinally spaced belt engaging rollers journaled in the bottom portion of said support frame for free rotation on transversely extending axes, tray-like electromagnet assemblies mounted in the bottom of said support frame, each of said electromagnet assemblies including frame members with oppositely disposed wall portions, an electromagnet core member extending between said wall forming portions, an electromagnet coil mounted on said core member, transversely extending guides on said support frame for slidingly supporting said tray-like assemblies, said wall portions having downwardly projecting parallel ribs which extend longitudinally of the support frame, belt supporting rollers at opposite ends of said support frame, a belt of substantial width carried on said end rollers and having parallel longitudinal grooves for receiving the ribs on said wall portions and means spaced longitudinally along the bottom of said support frame for holding the lowermost run of the belt against said belt engaging rollers and said ribs.

10. An overhead magnetic conveyor unit comprising a relatively narrow elongate mounting frame having a plane bottom face which is adapted to be disposed in a generally horizontal position, a plurality of longitudinally spaced brackets mounted on said frame and rollers journaled in said brackets for free rotation on transversely extending axes, said rollers being positioned to engage a belt having a lower run traveling along said bottom face, electromagnet assemblies mounted between said brackets, each of said electromagnet assemblies including frame members with oppositely disposed parallel wall portions, electromagnet core members extending between said wall forming portions, electromagnet coils mounted on said core members, transversely extending guideway formations between pairs of said brackets for slidingly supporting said assembly frame members, said assembly frame members having bottom plate portions which form core extensions with parallel downwardly projecting ribs which extend longitudinally of the mounting frame, belt supporting rollers at opposite ends of said conveyor unit, a belt carried on said end rollers and having parallel longitudinal grooves for receiving the ribs on said bottom plate portions and belt carrying rollers spaced longitudinally in the bottom of said mounting frame between certain of said belt engaging rollers, for holding the lowermost run of the belt against the belt engaging rollers and the ribs on the bottom plate portions of said assembly frame.

11. An overhead magnetic conveyor unit comprising a relatively narrow elongate mounting frame which has a plane bottom face adapted to be disposed in a generally horizontal position, a plurality of longitudinally spaced bearing supporting brackets mounted on the bottom face of said frame and belt engaging rollers journaled in bearings in said brackets for free rotation on transversely extending axes, electromagnet assemblies mounted between said brackets, each of said electromagnet assemblies including a drawer-like frame with oppositely disposed, parallel wall forming portions, one or more electromagnet core forming members extending between said wall forming portions, the wall forming portions constituting extensions of the magnet cores, electromagnet coils mounted on said cores, transversely extending guides on said mouting frame for slidingly supporting said drawer-like frame, said core extensions having bottom face portions with parallel ribs which extend longitudinally of the conveyor unit, belt supporting rollers at opposite ends of said mounting frame, an article carrying belt of substantial width carried on said end rollers with a bottom run extending along the bottom face of said mounting frame and having parallel longitudinal grooves in its innermost surface for accommodating the ribs in said bottom face portions and belt supporting roll members spaced longitudinally along the bottom face of said supporting frame, for holding the bottom run of the belt against the belt engaging rollers and the bottom face portions of said assembly frames.

12. An overhead magnetic conveyor unit as recited in claim 11, and means mounting said belt supporting rollers for sliding movement transversely of said mounting frame whereby said rollers may be removed without removing said article carrying belt.

13. An overhead magnetic conveyor unit as recited in claim 11, and said bearing supporting brackets having transversely extending shoulders forming said guides for slidingly supporting said electromagnet assemblies.

14. An overhead magnetic conveyor as recited in claim 11, and bearing brackets for said belt supporting roll members, and certain of said bearing supporting brackets having ledge formations extending transversely of the mounting frame for slidingly supporting the bearing brackets for said belt supporting roll members.

15. An overhead magnetic conveyor assembly comprising parallel elongate rail-type conveyor units and spaced upright end mounting frames, each conveyor unit including an elongate main frame and cross beams at each end of the conveyor units for supporting the units on the end mounting frames, each supporting cross beam having a depending pin adjacent each end thereof with a threaded portion and a nut mounted in threaded engagement thereon and said end frames having apertured cross members for accommodating the lower ends of the pins with the apertures being smaller than the nuts on the pins so that the nuts support the cross beams and whereby the elevation of each end of the cross beams may be adjusted by rotation of the nuts.

16. An overhead magnetic conveyor assembly comprising parallel elongate rail-type conveyor units and spaced upright end mounting frames, each conveyor unit including an elongate support frame having supporting pulleys at opposite ends thereof for a traveling belt, cross beams at opposite ends of the conveyor frames for supporting the conveyor units on the end mounting frames, means at opposite ends of each cross beam for raising and lowering the same to vary the vertical position of the conveyor ends, a drive shaft extending transversely of the one end mounting frame on which the end pulleys for the conveyor belts are mounted, a drive motor in fixed position relative to said one end mounting frame and having a transversely extending power shaft, and a universal connection between the motor shaft and the pulley drive shaft whereby the vertical position of the conveyor units may be adjusted without interrupting the travel of the conveyor belts.

References Cited by the Examiner
UNITED STATES PATENTS

| | | | |
|---|---|---|---|
| 1,868,384 | 7/1932 | Greenwood | 271—68 X |
| 2,600,273 | 6/1952 | Seifried. | |
| 2,642,174 | 6/1953 | Buccicone | 198—208 X |

SAMUEL F. COLEMAN, *Primary Examiner.*